(12) United States Patent
Egawa et al.

(10) Patent No.: US 6,675,464 B2
(45) Date of Patent: Jan. 13, 2004

(54) METHOD OF MANUFACTURING A MAGNETIC HEAD

(75) Inventors: Motoji Egawa, Iwata-gun (JP); Shigeyuki Ooishi, Iwata-gun (JP)

(73) Assignee: Minebea Co., LTD, Kitasaku-gun (JP)

( * ) Notice: Subject to any disclaimer, the term of this patent is extended or adjusted under 35 U.S.C. 154(b) by 249 days.

(21) Appl. No.: 09/824,059

(22) Filed: Apr. 3, 2001

(65) Prior Publication Data

US 2003/0196317 A1 Oct. 23, 2003

(30) Foreign Application Priority Data

Apr. 4, 2000 (JP) ........................................ 2000-102280

(51) Int. Cl.$^7$ ........................... G11B 5/133; G11B 21/16
(52) U.S. Cl. ............................... 29/603.12; 29/603.04; 29/603.16; 29/603.17; 29/603.2; 29/603.06; 360/125; 360/234.7; 360/235.1; 451/5; 451/364; 156/153
(58) Field of Search .......................... 29/603.01, 603.04, 29/603.07, 603.1, 603.12, 603.16, 603.17, 603.2, 603.06, DIG. 1; 360/125, 234.7, 234.8, 235.1, 235.4; 451/5, 364, 389; 156/153, 154

(56) References Cited

U.S. PATENT DOCUMENTS 3,648,361 A * 3/1972 Yagi et al. ............... 29/603.17
4,688,326 A * 8/1987 Linke ....................... 29/603.17
5,468,177 A * 11/1995 Kindler et al. .............. 451/364
5,694,677 A * 12/1997 Tsunoda ................... 29/603.12

FOREIGN PATENT DOCUMENTS

JP    3-181007   * 8/1991    .................. 360/125
JP   10-134316   * 5/1998

OTHER PUBLICATIONS

Li, S.X., "Grain Size Effects on Magnetic Properties and Core Process of Recording Head Ferrites", Ieee Transactions on Magnetics, vol. Mag–22, No. 1, Jan. 1986, pp. 14–18.*

* cited by examiner

*Primary Examiner*—A. Dexter Tugbang
(74) *Attorney, Agent, or Firm*—Oliff & Berridge, PLC

(57) ABSTRACT

A method of manufacturing magnetic heads is provided in which a slider and a back yoke are joined to form a magnetic head main body. The main body is then fixedly bonded to a holding member that supports the magnetic head as a single unit. A plurality of such magnetic heads are placed circumferentially on a soft adhesive sheet attached to a cylindrical base block. Touch lapping is then performed to a slider surface of the magnetic heads with a slurry on a surface table. Processing faces of the heads can be positioned flush with the surface table due to an elasticity of the soft adhesive sheet, thereby equally minimizing lapping amounts.

4 Claims, 2 Drawing Sheets

METHOD OF MANUFACTURING A MAGNETIC HEAD

BACKGROUND OF THE INVENTION

1. Field of the Invention

The present invention relates to a manufacturing method of a magnetic head used for a high recording density floppy disk drive (high recording density FDD) or the like.

2. Description of the Related Art

A separate type magnetic head of a standard recording density, which is assembled by joining together a slider including a magnetic core and a back yoke forming a closed magnetic path together with the magnetic core, is manufactured in such a way that after a sliding face of the slider including the magnetic core is worked with a lapping tape, etc. as a final processing to stabilize its sliding with a recording medium, the back yoke and the slider are joined together with an adhesive heated then cured, then are attached to a magnetic head holding member such as a gimbal with an adhesive heated then cured.

The thickness of a slider has been reduced according to a recent tendency of a thin drive, which leads to an easy deformation of slider. On the other hand, a close contact between the recording medium and the slider has been becoming increasingly important due to a higher recording frequency in accordance with a recording density becoming higher, so the deformation of slider must be reduced to a minimum.

Particularly for a magnetic head used for a so-called high recording density type floppy disk having a recording density of 100 MB (mega bytes) or more, it is definitely required to minimize the above mentioned deformation of slider.

As described above, a magnetic head has been conventionally manufactured in such a manner that a slider worked with a lapping tape or the like as a final processing is joined to a back yoke and then bonded to a magnetic head holding member such as a gimbal, and it has been difficult to maintain a precise flatness of slider, which is a precision of finishing a slider, due to an influence of stresses caused at the time of joining parts or heating or curing an adhesive, so the above requirement has not been duly fulfilled. And, recently the disk drive is becoming smaller in thickness and higher in a recording density, therefore control of the surface configuration of slider is becoming increasingly crucial in order to attain a higher and stable performance.

SUMMARY OF THE INVENTION

The present invention has been made in the light of the above problems, and an object thereof is to provide a method of manufacturing a magnetic head, whereby a flatness of slider is appropriately secured.

The present invention in a first aspect shows a method of manufacturing a magnetic head comprising a slider which faces a magnetic recording medium and includes a magnetic core having a gap and a back yoke which includes a coil provided corresponding to the magnetic core, is connected to the magnetic core to form a closed magnetic path and is bonded to the slider to thereby hold the slider, wherein a process of touch lapping is conducted to a slider surface after a magnetic head main body, which is assembled by joining together the slider and the back yoke, is fixedly bonded to a holding member which supports the magnetic head as a single unit.

Here, the process of touch lapping is a kind of lapping process, wherein a workpiece is elastically supported with a soft adhesive sheet (such as a low elasticity rubber formed of urethane) inserted between the workpiece and a member supporting the workpiece.

According to a second aspect of the present invention, in the manufacturing method as set forth in the first aspect the holding member is a mount block to solidly support the magnetic head main body.

According to a third aspect of the present invention, in the manufacturing method as set forth in the first aspect the holding member is a gimbal to flexibly support the magnetic head main body.

According to a fourth aspect of the present invention, in the manufacturing method as set forth in any one of the first to third aspects the magnetic head includes a plurality of magnetic cores having respective recording densities different from each other.

DETAILED DESCRIPTION OF THE PREFERRED EMBODIMENT

A method of manufacturing a magnetic head according to an embodiment of the present invention will be hereinafter described with reference to FIGS. 1 to 3.

Figure 1:
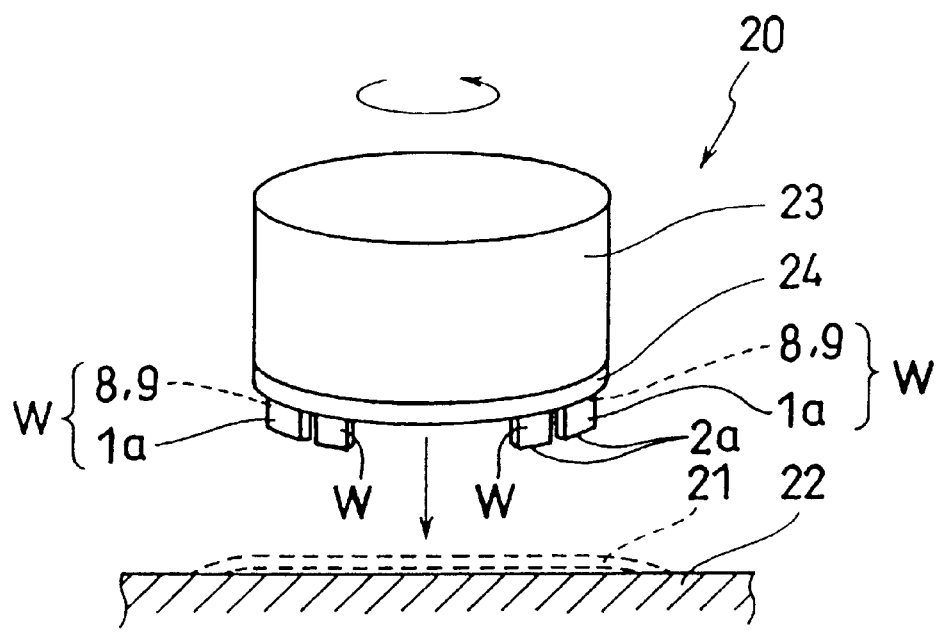
FIG. 1 is an exploded perspective view schematically showing a processing apparatus used in a method of manufacturing a magnetic head according to an embodiment of the present invention.

In this embodiment, a processing apparatus 20 shown in FIG. 1 is used for touch lapping a magnetic head shown in FIG. 3, as described hereinafter.

In FIG. 3, a magnetic head 1 generally comprises a rectangular plate-like slider 2 which faces magnetic recording media (not shown) and includes two magnetic cores (one is a standard recording density type and the other is a high recording density type, either of which is not shown) having respective gaps to cover two recording media of different recording densities, and the back yoke 3 which is connected to the magnetic cores to form closed magnetic paths and is bonded to the slider 2 with an adhesive (not shown) thereby holding the slider 2. The back yoke 3 includes pillars 6 (one pillar is not seen in FIG. 3) provided corresponding to each of the two magnetic cores thereby forming a part of respective closed magnetic paths and provided with coils 4 (one coil is not seen in FIG. 3) (one is a standard recording density type and the other is a high recording density type). The surface of the slider 2, which faces the magnetic recording media, is referred to as a slider surface 2a.

This magnetic head 1 is a so-called separate type magnetic head, wherein the slider 2 and the back yoke 3 are separate from each other before assembly and are joined together at a later process. As noted above, the slider 2 and the back yoke 3 are joined together into an assembly, which is hereinafter referred to as magnetic head main body 1a.

Here, the magnetic head main body 1a is provided in two types; one is bonded to a mount block 8 with an adhesive (not shown) so as to be solidly supported; the other is bonded to a gimbal 9 with an adhesive (not shown) so as to be flexibly supported.

The processing apparatus 20 shown in FIG. 1 comprises a rotatable surface table 22 which is made of a soft metal such as a tin and has thereupon a slurry 21 containing a fine particle abrasive, a rotatable base block 23 which is disposed facing the surface table 22 and supports a workpiece W (the magnetic head main body 1a bonded to either the mount block 8 or the gimbals 9 so as to form a single unit in this embodiment, a soft adhesive sheet 24 (such as a low elasticity rubber formed of urethane) which is inserted between the workpiece and the base block 23, and a driving control device (not shown) which rotates the surface table 22 and the base block 23. The slurry 21 is a mixture of fine diamond grinding particles of approximately 0.1 µm in particle size and a lubricant falling under a secondary petroleum class.

The driving control device (not shown) has planetary gears (not shown) so that the workpiece W supported by the base block 23 with the soft adhesive sheet 24 therebetween revolves around on the surface table 22 while rotating on its own axis. When the driving control device rotates the surface table 22 and the base block 23, the workpiece W is pressed against the slurry 21 (the surface table 22) whereby the slider surfaces 2a is lapped. This lapping process is called a touch lapping process, where the process is carried out while the workpiece W is elastically supported with the soft adhesive sheet 24 inserted between the workpiece W and the base block 23.

In this embodiment, after conducting a finishing process to the slider 2 to secure desired characteristics, the slider 2 and the back yoke 3 including the coils 4 and 5 are joined together with a resin heated then cured (thereby obtaining the magnetic head main body 1a).

The workpiece W can be obtained in two ways; one is to bond the magnetic head main body 1a to the mount block 8 as a holding member of the magnetic head 1 into a single unit with a resin heated then cured similarly to the above, and the other is to bond the magnetic head main body 1a to the gimbals 9 into a single unit in a similar manner.

The process of touch lapping is carried out to the slider surface 2a of the workpiece W (a single unit formed by bonding together the magnetic head main body 1a and either the mount block 8 or the gimbals 9).

Figure 2:
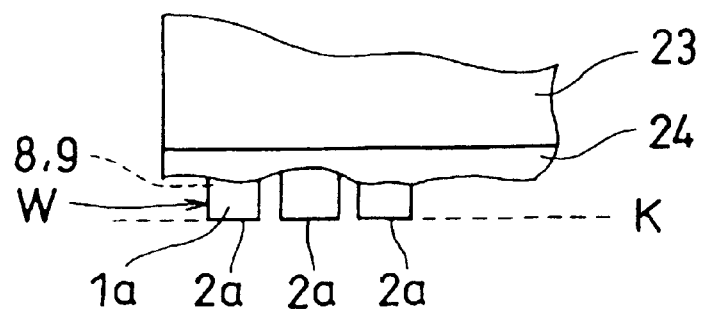
FIG. 2 is a sectional view schematically showing one process in the embodiment.

In the process of touch lapping, a plurality of workpieces W are circumferentially placed on the soft adhesive sheet 24 (for example, a low elasticity rubber formed of urethane and having a thickness of approx. 5 mm) attached to the base block 23 in such a manner that the slider surfaces 2a are positioned at a side opposite to the sheet 24 as shown in FIGS. 1 and 2, then the slider surfaces 2a are finely polished on the surface table 22 by means of the slurry 21.

Furthermore, as to FIGS. 1, 2 and FIG. 4 to be mentioned later, the variation in the height of the workpieces W is exaggerated.

In the process of touch lapping, the elasticity of the soft adhesive sheet 24 allows lapping faces K of the workpieces W to be flush with the surface table 22 so that the workpieces W have an equal lapping amount. The workpieces W can get a flat surface with a lapping amount of approx. 0.5 µm although it depends on its flatness before lapping.

Figure 4:
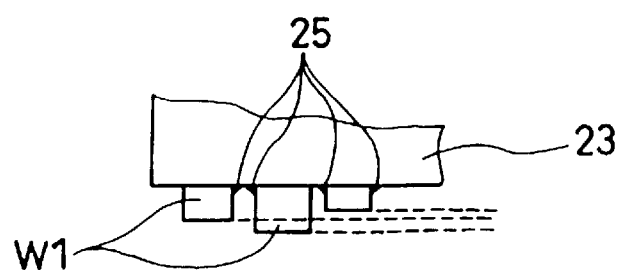
FIG. 4 is a sectional view schematically showing a process of lapping wherein workpieces are placed directly on a base block and fixed with a wax.

While a lapping process, where the workpieces W1 are placed directly on the base block 23 and fixed with a wax 25 or the like as shown in FIG. 4 (non touch lapping process), may cause a warp in the workpieces W1, the workpieces W do not suffer a warp in the touch lapping process of the present embodiment, which is a fine processing.

An experiment was conducted with the processing device 20 under a condition that a rotational speed of the surface table 22 was suppressed to about 10 rpm and a load per workpiece was set to approx. 75 g, resulting in that the flatness was improved from 200–400 nm to 50 nm or less.

Subsequently to the process of touch lapping, a process of touch blending which uses a lapping tape in place of the slurry 21 is conducted so as to form a blended surface smoothly continuous with the flat surface After the above process, there are no more mechanical process nor resin heating and curing processes conducted that may cause deformation, so the flatness can be securely maintained.

Since an excellent flatness is obtained and maintained with the touch lapping process as described, a writing and reading with a core for a high recording density can be performed in a good shape.

In general, while a magnetic bead of a standard recording density type can tolerate a performance deterioration caused by a minute deformation of a slider, a magnetic head of a high recording density type cannot tolerate it The magnetic head 1 manufactured through the method of the present embodiment can be certainly prevented from a deterioration in performance due to a minute deformation of the slider 2, which is required for the magnetic head of a high recording density type.

In the present embodiment, the magnetic head 1 includes the magnetic cores of both the standard recording density type and the high recording density type, and the flatness of the slider 2 is appropriately secured through the above manufacturing method, so the magnetic head 1 thus obtained can satisfactorily perform the writing and reading on and from the recording medium for both the recording density types and secure a compatibility as well.

In the present embodiment, since the process of touch lapping is performed to the slider surface 2a of the workpiece W (a single unit formed by bonding together the magnetic head main body 1a and either the mount block 8 or the gimbals 9), any minute deformation of the slider 2 caused by an adhesive can be corrected through a final finishing process, resulting in a precise flatness.

Although the embodiment including the experiment exemplifies the process of touch lapping, that is a lapping method (a lapping process) where planetary gears are applied and where the workpieces, with the rotation of the surface table 22, revolve around on the surface table 22 while rotating on their own axis, the present invention should not be limited to the embodiment. For example, a process of touch lapping in a method of lapping master (a lapping process), where the workpieces rotate on their own axis at a fixed position on the surface table 22 rotating, may be employed.

Moreover, the embodiment exemplifies the magnetic head including two magnetic cores, but the present invention should not be limited to this. In the present invention the magnetic head 1 may include a single or three or more magnetic cores.

Figure 3A:
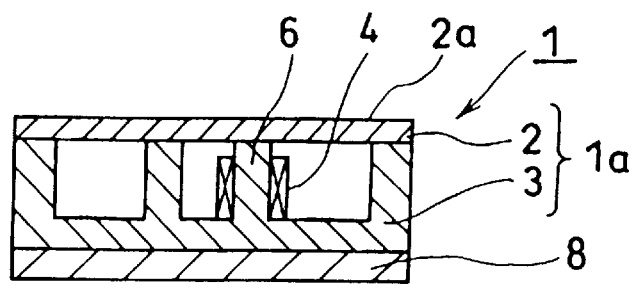
FIG. 3(A) is a sectional view showing a workpiece in the embodiment, comprising a magnetic head rain body and a mount block.
Figure 3B:
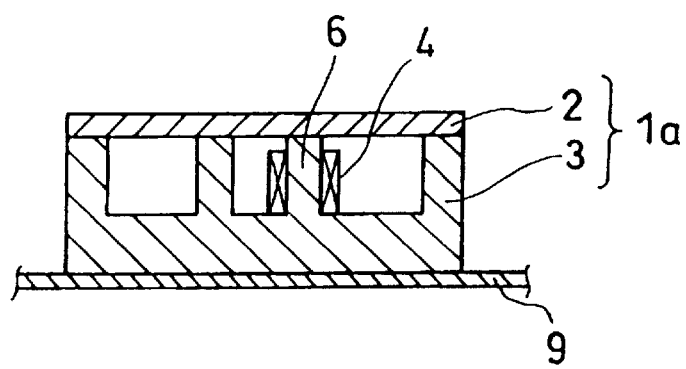
FIG. 3(B) is a sectional view showing a workpiece in the embodiment, comprising the magnetic head main body and a gimbals.

While the embodiment exemplifies two types of magnetic heads: one where the magnetic head main body 1a and the mount block 8 are bonded together into a single unit as shown in FIG. 3(A), and the other where the magnetic head main body 1a and the gimbals 9 are bonded together into a single unit as shown in FIG. 3(B), the present invention may have a spacer for adjusting a height of the magnetic head main body, whereby the magnetic head is made to be composed of the magnetic head main body, the spacer and either the mount block or the gimbals.

According to the first aspect of the present invention, since a process of touch lapping, in which processing faces of workpieces can be positioned flush with a surface table due to an elasticity of a soft adhesive sheet, is conducted after a slider and a back yoke are joined together, a minute deformation of the slider caused when an adhesive used to join the slider and the back yoke is heated and cured can be corrected thereby securing a flatness of the slider while lapping amounts of the workpieces can be equally minimized.

According to the second aspect of the present invention, a flatness of the slider can be secured by correcting a minute deformation of the slider caused when an adhesive used to join a magnetic head main body and a mount block is heated and cured.

According to the third aspect of the present invention, a flatness of the slider can be secured by correcting a minute deformation of the slider caused when an adhesive used to join a magnetic head main body and a gimbals is heated and cured.

According to the fourth aspect of the present invention, since a magnetic head has a plurality of magnetic cores having respective different recording densities and a flatness of the slider in this magnetic head is appropriately secured, the magnetic head thus obtained can satisfactorily perform writing and reading on and from recording media having different recording densities.

What is claimed is:

1. A method of manufacturing magnetic heads which comprise:
   a slider which faces a magnetic recording medium and includes a magnetic core having a gap; and
   a back yoke which includes a coil provided corresponding to the magnetic core, is connected to the magnetic core to thereby form a closed magnetic path, and is bonded to the slider thereby holding the slider; the manufacturing method comprising:
   assembling a plurality of magnetic head main bodies by joining the slider and the back yoke of each respective magnetic head main body together to form a plurality of magnetic heads;
   fixedly bonding each said magnetic head to a holding member that is a mount block to rigidly support each magnetic head as a single unit;
   placing the plurality of magnetic heads circumferentially on a soft adhesive sheet attached to a cylindrical base block; and
   subsequently touch lapping a slider surface of each of the plurality of magnetic heads.

2. The manufacturing method as set forth in claim 1, wherein each magnetic head includes a plurality of magnetic cores having respective recording densities different from each other.

3. A method of manufacturing magnetic heads which comprise:
   a slider which faces a magnetic recording medium and includes a magnetic core having a gap; and
   a back yoke which includes a coil provided corresponding to the magnetic core, is connected to the magnetic core to thereby form a closed magnetic path, and is bonded to the slider thereby holding the slider; the manufacturing method comprising:
   assembling a plurality of magnetic head main bodies by joining the slider and the back yoke of each respective magnetic head main body together to form a plurality of magnetic heads;
   fixedly bonding each said magnetic head to a holding member that is a gimbal to flexibly support each magnetic head as a single unit;
   placing the plurality of magnetic heads circumferentially on a soft adhesive sheet attached to a cylindrical base block; and
   subsequently touch lapping a slider surface of each of the plurality of magnetic heads.

4. The manufacturing method as set forth in claim 3, wherein each magnetic head includes a plurality of magnetic cores having respective recording densities different from each other.

* * * * *